United States Patent
Perumalla et al.

(10) Patent No.: US 11,892,314 B2
(45) Date of Patent: Feb. 6, 2024

(54) THERMALLY EFFICIENT ROUTE SELECTION

(71) Applicant: INTERNATIONAL BUSINESS MACHINES CORPORATION, Armonk, NY (US)

(72) Inventors: Saraswathi Sailaja Perumalla, Visakhapatnam (IN); Venkata Vara Prasad Karri, Visakhapatnam (IN); Sarbajit K. Rakshit, Kolkata (IN); Swetha Sukeerthi Chettupalli, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 17/321,950

(22) Filed: May 17, 2021

(65) Prior Publication Data

US 2022/0364877 A1 Nov. 17, 2022

(51) Int. Cl.
*G06N 3/084* (2023.01)
*G01C 21/36* (2006.01)
*G01C 21/34* (2006.01)

(52) U.S. Cl.
CPC ..... *G01C 21/3691* (2013.01); *G01C 21/3461* (2013.01); *G01C 21/3492* (2013.01); *G06N 3/084* (2013.01)

(58) Field of Classification Search
None
See application file for complete search history.

(56) References Cited

U.S. PATENT DOCUMENTS

| 6,345,767 B1 | 2/2002 | Burrus, IV et al. |
| 7,089,115 B2 | 8/2006 | Chapman et al. |

(Continued)

FOREIGN PATENT DOCUMENTS

| CN | 112651679 A | * 4/2021 | ....... G06Q 10/08355 |
| DE | 10202756 | 8/2003 | |

(Continued)

OTHER PUBLICATIONS

PCT International Search Report and Written Opinion dated Sep. 14, 2022, 12pp for Application No. PCT/EP2022/062910 filed May 13, 2022.

(Continued)

*Primary Examiner* — Redhwan K Mawari
*Assistant Examiner* — Kai Wang
(74) *Attorney, Agent, or Firm* — KONRAD RAYNES DAVDA & VICTOR LLP; Janaki K. Davda

(57) ABSTRACT

Provided are techniques for thermally efficient route selection. A request is received for a route for a vehicle to travel from a first geographic location to a second geographic location. Route data is retrieved for each of a plurality of routes, where the route data includes, for each portion of each route at a given time and day, air temperature adjacent to a road surface. Vehicle data is retrieved for the vehicle, where the vehicle data includes a desired temperature of an item being carried and a desired inlet air temperature. The route from the first geographic location to the second geographic location is determined using the route data and the vehicle data, where the route is thermally efficient. The vehicle is directed along the route, where the route specifies a lane from a plurality of lanes of a road for each portion of the route.

20 Claims, 13 Drawing Sheets

(56) References Cited

U.S. PATENT DOCUMENTS

| | | | |
|---|---|---|---|
| 8,255,162 | B2 | 8/2012 | Okude et al. |
| 10,603,982 | B2* | 3/2020 | Ragazzi ............. B60H 1/00392 |
| 11,332,146 | B2* | 5/2022 | Uemori ............. B60W 60/0023 |
| 2009/0048775 | A1 | 2/2009 | Okude et al. |
| 2011/0160993 | A1 | 6/2011 | Tsurutani et al. |
| 2019/0301877 | A1* | 10/2019 | Duale ................ G01C 21/3484 |
| 2020/0172110 | A1 | 6/2020 | Uemori et al. |
| 2021/0256472 | A1* | 8/2021 | Javidan ............. G07C 9/00896 |

FOREIGN PATENT DOCUMENTS

| | | | |
|---|---|---|---|
| DE | 102014006653 A1 | 11/2015 | |
| DE | 102017109730 | 11/2017 | |
| JP | 2020134408 A * | 8/2020 | |
| WO | 2007088859 | 8/2007 | |
| WO | WO-2020205648 A1 * | 10/2020 | ............ B60W 40/04 |

OTHER PUBLICATIONS

Haug et al., "Usage of Road Weather Sensors for Automatic Traffic Control on Motorways", Elsevier Enhanced Reader, Transportation Research Procedia, vol. 15, 2016, Total pp. 11, ISEHP 2016, International Symposium on Enhancing Highway Performance.

"Heat Transfer Formula", Heat Transfer Formula: Definition, Concepts and Examples, [online][retreved Apr. 22, 2021] Total pp. 12, https://www.toppr.com/guides/physics-formulas/heat-transfer-formula/.

"How to Calculate Heat Transfer", [online][retrieved Feb. 9, 2021] Total pp. 5, https://sciencing.com/calculate-heat-transfer-4894948.html.

Mandzuka, "Intelligent Transport Systems Selected Lectures", Intelligent Transport Systems Department Faculty of Transport and Traffic Sciences University of Zagreb, 2015, Total pp. 115.

Stellingwerf, et al., "Reducing CO2 emissions in temperature-controlled road transportation using the LDVRP model", Elsevier Enhanced Reader, Transportation Research Part D 58, 2018, Total pp. 14.

Wikipedia, "Heat transfer coefficient", [online][retrieved Feb. 9, 2021] Total pp. 12, https://en.wikipedia.org/wiki/Heat_transfer_coefficient.

Mell, P. et al., "Effectively and Securely Using the Cloud Computing Paradigm", [online], Oct. 7, 2009, retrieved from the Internet at <URL: http:/csrc.nist.gov/groups/SNS/cloud-computing/cloud-computing-v26.ppt>, Total 80 pp.

Mell, P. et al., "The NIST Definition of Cloud Computing (Draft)", Sep. 2011, Computer Security Division Information Technology Laboratory National Institute of Standards and Technology, Total 7 pp.

Chapman, et al., "A geomatics based road surface temperature prediction model", Elsevier Enhanced Reader, Science Direct, Science of the Total Environment 360, 2006 (available online Oct. 14, 2005), Total pp. 13 (https://www.sciencedirect.com/science/article/abs/pii/S0048969705005607).

Figueroa, et al., "AIr Friction Vehicle Minimizer for Weather-Service-Enabled Portable Navigation Device", IP.com, Prior Art Database Technical Disclosure, IP.com No. IPCOM000174423D, IP.com Electronic Publication Date: Sep. 8, 2008, Total pp. 10.

Hu, et al., "Modeling Road Surface Temperature from Air Temperature and Geographical Parameters—Implication for the Application of Floating Car Data in a Road Weather Forecast Model", Department of Earth Sciences, University of Gothenburg, Gothenburg, Sweden, May 26, 2018, Total pp. 16.

* cited by examiner

THERMALLY EFFICIENT ROUTE SELECTION

BACKGROUND

Embodiments of the invention relate to thermally efficient route selection. In particular, embodiments are based on thermally efficient route selection based on the temperature of air adjacent to a road surface.

For a vehicle traveling from point A to point B, there are conventional navigation systems that suggest a particular road based on factors, such as traffic, time of day, reports of accidents, etc.

SUMMARY

In accordance with certain embodiments, a computer-implemented method is provided for thermally efficient route selection. The computer-implemented method comprises operations. A request is received for a route for a vehicle to travel from a first geographic location to a second geographic location. Route data is retrieved for each of a plurality of routes, where the route data includes, for each portion of each route at a given time and day, air temperature adjacent to a road surface. Vehicle data is retrieved for the vehicle, where the vehicle data includes a desired temperature of an item being carried and a desired inlet air temperature. The route from the first geographic location to the second geographic location is determined using the route data and the vehicle data, where the route is thermally efficient. The vehicle is directed along the route, where the route specifies a lane from a plurality of lanes of a road for each portion of the route.

In accordance with other embodiments, a computer program product is provided for thermally efficient route selection. The computer program product comprises a computer readable storage medium having program code embodied therewith, the program code executable by at least one processor to perform operations. A request is received for a route for a vehicle to travel from a first geographic location to a second geographic location. Route data is retrieved for each of a plurality of routes, where the route data includes, for each portion of each route at a given time and day, air temperature adjacent to a road surface. Vehicle data is retrieved for the vehicle, where the vehicle data includes a desired temperature of an item being carried and a desired inlet air temperature. The route from the first geographic location to the second geographic location is determined using the route data and the vehicle data, where the route is thermally efficient. The vehicle is directed along the route, where the route specifies a lane from a plurality of lanes of a road for each portion of the route.

In accordance with yet other embodiments, a computer system is provided for thermally efficient route selection. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A request is received for a route for a vehicle to travel from a first geographic location to a second geographic location. Route data is retrieved for each of a plurality of routes, where the route data includes, for each portion of each route at a given time and day, air temperature adjacent to a road surface. Vehicle data is retrieved for the vehicle, where the vehicle data includes a desired temperature of an item being carried and a desired inlet air temperature. The route from the first geographic location to the second geographic location is determined using the route data and the vehicle data, where the route is thermally efficient. The vehicle is directed along the route, where the route specifies a lane from a plurality of lanes of a road for each portion of the route.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
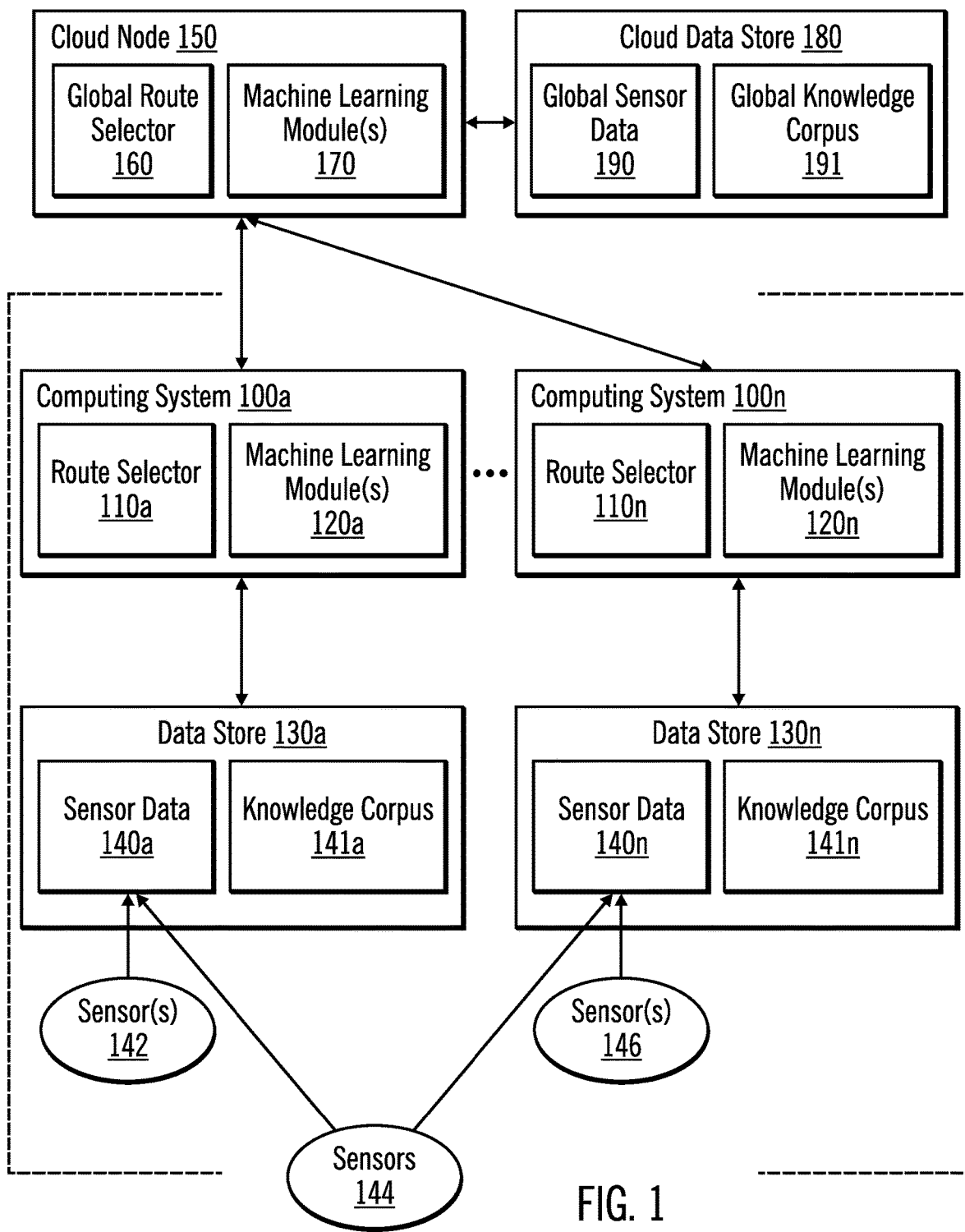
FIG. 1 illustrates, in a block diagram, a computing environment in accordance with certain embodiments.

FIG. 1 illustrates, in a block diagram, a computing environment in accordance with certain embodiments. Computing systems $100a \ldots 100n$ are connected to a cloud node 150. Each computing system $100a \ldots 100n$ is connected to a data store $130a \ldots 130n$. Each computing system $100a \ldots 100n$ includes a route selector $110a \ldots 110n$ and one or more machine learning modules $120a \ldots 120n$. Each data store $130a \ldots 130n$ includes sensor data $140a \ldots 140n$ and a knowledge corpus $141a \ldots 141n$. The sensor data $140a$ includes data from one or more sensors 142 and one or more sensors 144. The sensor data $140n$ includes data from one or more sensors 144 and one or more sensors 146. The one or more sensors 142 are specific to the computing system 100*a* (e.g., these are sensors associated with a vehicle in which the computing system 100*a* is located). The one or more sensors 146 are specific to the computing system 100*n* (e.g., these are sensors associated with a vehicle in which the computing system 100*n* is located). The vehicles may be cars, trucks, buses, or any other vehicle with a combustion engine or any vehicle that uses pre-heated inlet air. The one or more sensors 144 may be coupled to a route (e.g., on a railing, a sign post, a traffic light, etc.) that the vehicle is traversing. The route may include any type of road (e.g., a street, a dirt road, an unpaved road, a highway, a freeway, etc.).

In certain embodiments, the computing system 100*a*, the data store 130*a*, and the one or more sensors 142 are part of one vehicle. In certain embodiments, the computing system 100*n*, the data store 130*n*, and the one or more sensors 146 are part of another vehicle.

The cloud node 150 includes a global route selector 160 and one or more machine learning modules 170. The cloud node 150 is connected to a cloud data store 180. The cloud data store 180 includes global sensor data 190 and a global knowledge corpus 191. The global sensor data 190 includes the sensor data associated with each specific vehicle (sensor data 142 and 146) and sensor data not associated with each specific vehicle (sensor data 144). The global route selector 160 selects a route for a vehicle based on sensor data from multiple vehicles and from sensors along the route. In certain embodiments, the global sensor data 190 is forwarded by the route selectors 110*a* . . . 110*n* to the global route selector 160 for storage in the cloud data store 180. In other embodiments, the global sensor data 190 is forwarded directly from the sensors 142, 144, 146 to the global route selector 160 for storage in the cloud data store 180.

In certain embodiments, using historical learning, each route selector 110*a* . . . 110*n*, 160 predicts air temperature adjacent to (e.g., touching or close to) a road surface for a route or a portion of a route, and, based on desired air conditioning and desired pre-heating of inlet air, the route selector 110*a* . . . 110*n*, 160 identifies one or more routes for a particular vehicle. The prediction of the air temperature adjacent to the road surface may be based on historical air temperatures at a particular time of day (on different days by one or more sensors or on the same day and recorded by different sensors) and at a particular geographic location.

If multiple routes are identified, the route selector 110*a* . . . 110*n*, 160 provides a ranking or a score for the routes. In certain embodiments, the score is based on the air temperature adjacent to the road surface. In certain embodiments, the air temperature adjacent to the road surface is based on radiation.

If the air temperature adjacent to the road surface is equal to or higher than an inlet air temperature desired by the vehicle, then, the inlet air is considered pre-heated and does not need further heating by the vehicle, which saves energy and fuel.

Different portions of the road may have different air temperatures adjacent to the road surfaces based on various factors, such as the material used to create that portion of the road, weather conditions, shade/shadow near that portion of the road, etc.

Also, the route selector 110*a* . . . 110*n*, 160 may provide different routes for different vehicles. The route may be described as a path from a first geographic location to one or more geographic locations that includes one or more roads, where each of the roads may be a street, a dirt road, an unpaved road, a highway, a freeway, etc. The route is traveled by the vehicle along the one or more roads. A geographic location may be described as a geo-position that is described with geographic coordinates (e.g., latitude and longitude).

For a vehicle with an internal combustion engine (IC engine), inlet air refers to air that is brought in via an air intake system to allow air to reach the IC engine. Oxygen in the air is one of the ingredients for the engine combustion process.

For a vehicle, pre-heating of inlet air is effective for the IC engine. Pre-heating of inlet air is a technique to increase the temperature of inlet air by utilizing the thermal energy of exhaust gas (expelled by the vehicle via the exhaust pipe) to increase the thermal efficiency of the IC engine. Air pre-heating not only improves overall efficiency of the IC engine, but also act as an emission control technique. In particular, the thermal energy of the exhaust gas is used for pre-heating inlet air.

Different road surfaces may have different levels of temperature. That is, each road surface radiates heat and increases the temperature of air adjacent to the road surface. The temperature of air adjacent to the road surface may also be referred to as air temperature adjacent to the road surface or road surface air temperature. For example, tarred roads, concrete roads, dirt roads, and metallic roads may radiate a different amount of heat (which may be described as the flow of thermal energy). At the same time, weather conditions may also impact pre-heating of inlet air. That is, the air adjacent to the road surface may be hot due to hot weather conditions, the material used for constructing the road, shadow/shade on the road, time of day etc. In particular, the road surface may be hot, and, air that is passing adjacent to the road surface increases in temperature because of conduction and radiation. The increasing temperature of the air causes the air to be pre-heated. This pre-heated air may be inlet air to a vehicle. If the air adjacent to the road surface is already a higher temperature, then less energy will be needed to pre-heat inlet air. At the same time, if the air adjacent to the road surface is already a higher temperature, then more energy is required for air conditioning within the vehicle.

With embodiments, the route selector 110*a* . . . 110*n*, 160 identifies thermally efficient routes based on the energy to be used to pre-heat the inlet air while taking into account both air temperature adjacent to the road surface and the energy used for air conditioning. That is a first route is thermally more efficient than a second route if that first route uses less energy to pre-heat the inlet air. In particular, a route is selected that decreases the energy used to pre-heat the inlet air. With embodiments, the route selected is one with a higher air temperature adjacent to the road surface, which will result in less energy to pre-heat the inlet air.

In certain embodiments, using historical learning, the route selector 110*a* . . . 110*n*, 160 predicts air temperature adjacent to a road surface in different contextual situations (e.g., based on geographical location, material used for constructing the road, timing of day, weather conditions, etc.) and uses the predicted air temperature to dynamically recommend a route or change an existing route with the goal of thermal efficiency. Different vehicles traveling on the same road or near each other may receive recommendations of different routes. The prediction of the air temperature may be based on historical air temperatures at a particular time of day and at a particular geographic location.

With embodiments, the route selector 110*a* . . . 110*n*, 160 identifies a road and, in some cases, different lanes for different portions of the road, to save energy (or power, which is energy per unit of time). With embodiments, saving energy also results in saving fuel. In certain embodiments, based on historical learning, the route selector 110a . . . 110n, 160 identifies the distribution (e.g., ratio) between the energy savings from pre-heating of inlet air (based on road surface air temperature) and the energy required for air conditioning. With reference to air conditioning, one vehicle may not require any air conditioning for goods (e.g., rocks), another vehicle may need air conditioning for goods (e.g., milk), and passengers may need air conditioning. Based on the distribution, the route selector 110a . . . 110n, 160 recommends a route or reroutes the vehicle for thermal effectiveness.

In certain embodiments, the route selector 110a . . . 110n, 160 uses the following heat transfer formula to identify an efficient route based on desired air conditioning:

$$Q = m \times c \times \Delta T$$

With embodiments, "Q" represents the heat transferred, "m" represents mass of a first element, "c" represents specific heat capacity of the element, and the "ΔT" (delta T) represents a difference in temperature between the first element and the second element. With embodiments, "c" may be described how much energy (or heat) is needed to change the temperature of the first element of the mass "m" by a given value and is measured in kilojoule (kJ) per kg. For example, there is a first road with an air temperature adjacent to the road surface at 30 degrees Celsius, and a second road with an air temperature adjacent to the road surface at 25 degrees Celsius. The element in this example is milk, and the mass of the milk is 100 kilograms (kg) being transported in a vehicle. In this example, the specific heat capacity "c" is 3.85 kilojoule (kJ) per kg, and, the desired temperature of the milk is 2 degrees Celsius.

For this example, the heat transfer for the two roads is as follows:

First road: Q=100×3.85×(30−2)=10,780 kJ
Second road: Q=100×3.85×(25−2)=8,855 kJ

In this example, the second road is thermally efficient since "Q", heat transferred, is lower. In certain embodiments, the temperatures of the roads are predicted based on historical data of the temperatures of those roads at particular times of day and, optionally, based on particular weather conditions on the day that the roads are to be taken. In certain embodiments, the heat transferred may be adjusted based on route data 210 and vehicle data 250 that is not already included in the heat transfer formula.

Also, the heat transfer formula may be used to identify an efficient route based on desired inlet air. In this example, the air temperature adjacent to the road surface is T1 (e.g., there is a first road with an air temperature adjacent to the road surface at 30 degrees Celsius and a second road with an air temperature adjacent to the road surface at 25 degrees Celsius). The element in this example is inlet air, and the mass of the inlet air is Y kilograms (kg). In this example, the specific heat capacity "c" Z kilojoule (kJ) per kg, and, the desired temperature of the inlet air is T2 degrees Celsius. Then, Q may be determined for the first road and the second road to determine how much energy is used in preheating the inlet air based on the first road and the second road.

In certain embodiments, the heat transferred $Q_1$ for the first road may be determined based on the desired air conditioning, the heat transferred $Q_2$ for the first road may be determined based on the inlet air, and the values of $Q_1$ and $Q_2$ may be combined (e.g., summed, averaged, etc.) to determine a final heat transferred value $Q_A$. This is also done for the second road. In particular, the heat transferred $Q_3$ for the second road may be determined based on the desired air conditioning, the heat transferred $Q_4$ for the second road may be determined based on the inlet air, and the values of $Q_3$ and $Q_4$ may be combined (e.g., summed, averaged, etc.) to determine a final heat transferred value $Q_B$. In certain embodiments, the values of $Q_A$ and $Q_B$ are compared to determine whether the first road or the second road is thermally more efficient. In certain embodiments, the values of $Q_A$ and $Q_B$ may be adjusted based on route data 210 and vehicle data 250 that is not already included in the heat transfer formula.

With embodiments, the route selector 110a . . . 110n, 160 may determine heat transfer for different elements (e.g., inlet air, milk, etc.), and use the different heat transfer values to identify a thermally efficient route (e.g., using an average or other combination of the heat transfer values).

In certain embodiments, the air temperature adjacent to the road surface is T1, which is heated from the radiation and conduction heat from the road surface. The air temperature T1 depends on the air temperature of the road surface (i.e., if the air temperature of the road surface is lower, then the temperature T1 is lower, and, if the air temperature of the road surface is higher, then the temperature T1 is higher.

If the air temperature of the road surface is higher, then the inlet temperature of air is higher. In this example, the IC engine desires inlet air to be temperature T2. Then, the air adjacent to the road surface is heated from temperature T1 to temperature T2 for the desired inlet air temperature, and the heat used to go from temperature T1 to temperature T2 is proportionate to (T2−T1). Then, if the temperature T1 is higher, then (T2−T1) is less than when temperature T1 is lower, and less energy is used to heat the air for the IC engine, which results in fuel savings.

In certain embodiments, an optimal inlet air temperature is identified based on the vehicle data of different vehicles.

In certain embodiments, based on the historically captured air temperature adjacent to the road surface and based on the road construction, the route selector 110a . . . 110n, 160 recommends how the road should be constructed so that air temperature adjacent to the road surface is optimum for a desired (e.g., optimal) thermal efficiency (e.g., recommending that cement is to be used).

In certain embodiments, the route selector 110a . . . 110n, 160 also considers the already constructed road, geo-specific aspects (e.g., where there is more airflow then hotter air adjacent to the road surface will be more quickly dissipated from the road surface, and, where there is less airflow, then hotter air adjacent to the road surface will be more slowly (if at all), dissipated from the road surface), industries and types of industries near to the road, and recommends the type of trees or plantation so that air temperature adjacent to the road surface is optimum for optimal thermal efficiency.

In certain embodiments, different lanes of a road may have different air temperatures adjacent to the road surface. For example, lanes that are closer to trees may have more shade and a lower air temperature adjacent to the road surface. Then, based on the dynamic change in the distribution between the energy required between inlet air preheating and air conditioning, the route selector 110a . . . 110n, 160 dynamically changes the route as the vehicle is traveling.

In certain embodiments, as road air temperature adjacent to the road surface may change from time to time, the route selector 110a . . . 110n, 160 considers the duration of vehicle travel (i.e., journey time) and aggregated thermal efficiency over a period of the duration. Based on, the respecify route selector 110a . . . 110n, 160 recommends ae route for the vehicle.

In certain embodiments, based on air flow (wind), shadow or layout of the trees on the road, and sunlight intensity direction shifts, the route selector 110a . . . 110n, 160 recommends a route for the vehicle. In certain embodiments, the route selector 110a . . . 110n, 160 recommends parking the vehicle for a period of time before continuing on the route, and this may be based on the vehicle load, crowd (of vehicles and/or of people in the vehicle), and duration of vehicle travel.

In certain embodiments, using historical learning, the route selector 110a . . . 110n, 160 predicts total traffic load of multiple vehicles and thermal efficiency gained because of the selection of one or more routes for the multiple vehicles based on the air temperature adjacent to the road surface. The, the route selector 110a . . . 110n, 160 distributes the traffic (different vehicles) in one or more different routes. The prediction of the traffic load may be based on historical traffic loads at a particular time of day and at a particular geographic location.

In certain embodiments, the computing system 100a . . . 100n, with the respective data store 130a . . . 130n, is part of a vehicle. Each vehicle is uniquely identified (e.g., by license plate, by Vehicle Identification Number (VIN), etc.).

Figure 2A:
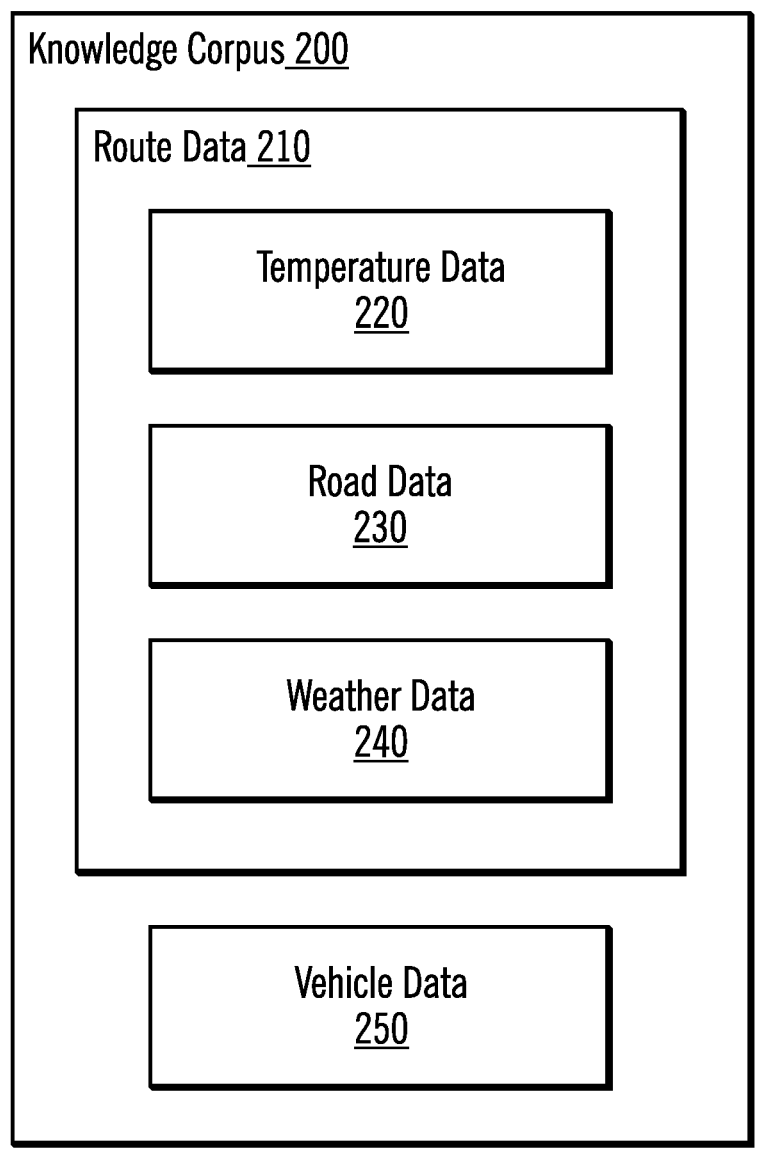
FIG. 2A illustrates a representation of a knowledge corpus in accordance with certain embodiments.

FIG. 2A illustrates a representation of a knowledge corpus 200 in accordance with certain embodiments. In certain embodiments, the knowledge corpus 141a . . . 141n stores the data of the knowledge corpus 200 for a particular vehicle, while the global knowledge corpus 191 stores the data of the knowledge corpus for multiple vehicles. With embodiments, the knowledge corpus 200 stores historical data and current data. The knowledge corpus 200 includes route data 210 and vehicle data 250.

The route data 210 includes: for each portion of a route (i.e., geographic location) at a given time/day, temperature data 220, road data 230, weather data 240, and possibly other data. The temperature data 220 may include one or more values (from different sensors associated with the road and/or with one or more vehicles) of the air temperature adjacent to the road surface at a particular time and day and at a particular geographic location. Alternatively, the temperature data 220 may include a predicted value of the air temperature adjacent to the road surface at a particular time based on multiple values of the air temperature adjacent to the road surface at that particular time (from different days and/or different sensors). The road data 230 stores information about the portion of the road at that portion of the route, such as what the road is made of (e.g., tar, concrete, metal, dirt, etc. because different materials may get to a different temperature and give off a different amount of heat), how the road was constructed (e.g., the road is between buildings or hills that block or limit airflow or build between fields that allow for a lot of airflow), whether there is shade along the road (e.g., a lot of trees, buildings, etc.), etc. The weather data 240 indicates the weather conditions (e.g., whether there is sunshine, clouds, rain, snow, air flow (wind), etc.).

The vehicle data 230 for a particular vehicle stores air conditioning data, the desired temperature of the item being carried (e.g., the desired temperature of milk being carried by the vehicle), the desired temperature of the inlet air, the temperature within the vehicle, and possible other data. The air conditioning data includes information about whether the vehicle needs air conditioning and how much is needed (e.g., a vehicle carrying milk is to be air conditioned to a first temperature, while another vehicle carrying medication is to be air conditioned to a second temperature).

Figure 2B:
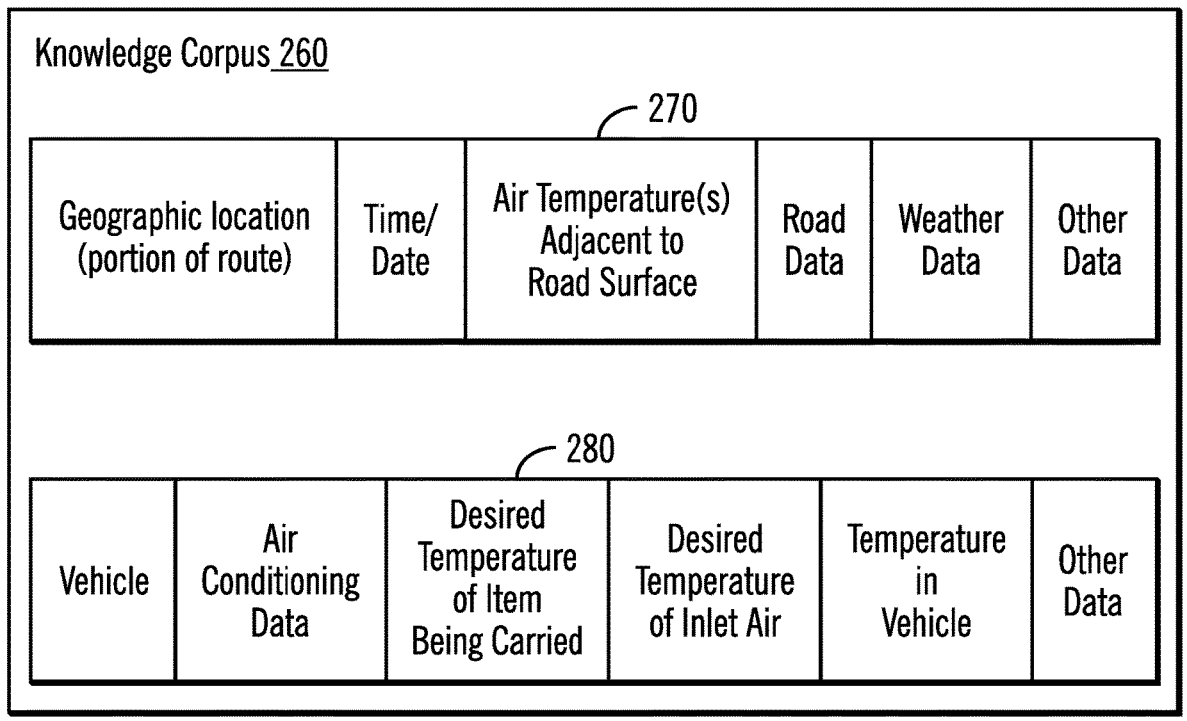
FIG. 2B illustrates an alternative embodiment of a knowledge corpus with further details about the route data and the vehicle data in accordance with certain embodiments.

FIG. 2B illustrates an alternative embodiment of a knowledge corpus 260 with further details about the route data and the vehicle data in accordance with certain embodiments. The knowledge corpus 260 includes one or more tables for the route data (such as table 270) and one or more tables for the vehicle data (such as table 280). The route data 270 includes: for each portion of a route (i.e., geographic location) at a given time/day, one or more air temperatures adjacent to the road surface, road data, weather data, and possibly other data (e.g., identifying particular sensors that provided the one or more air temperatures adjacent to the road surface). The vehicle data 280 includes: air conditioning data, the desired temperature of the item being carried, the desired temperature of the inlet air, the temperature in the vehicle, and possibly other data (e.g., the sources of the other data specified as particular sensors).

Figure 3:
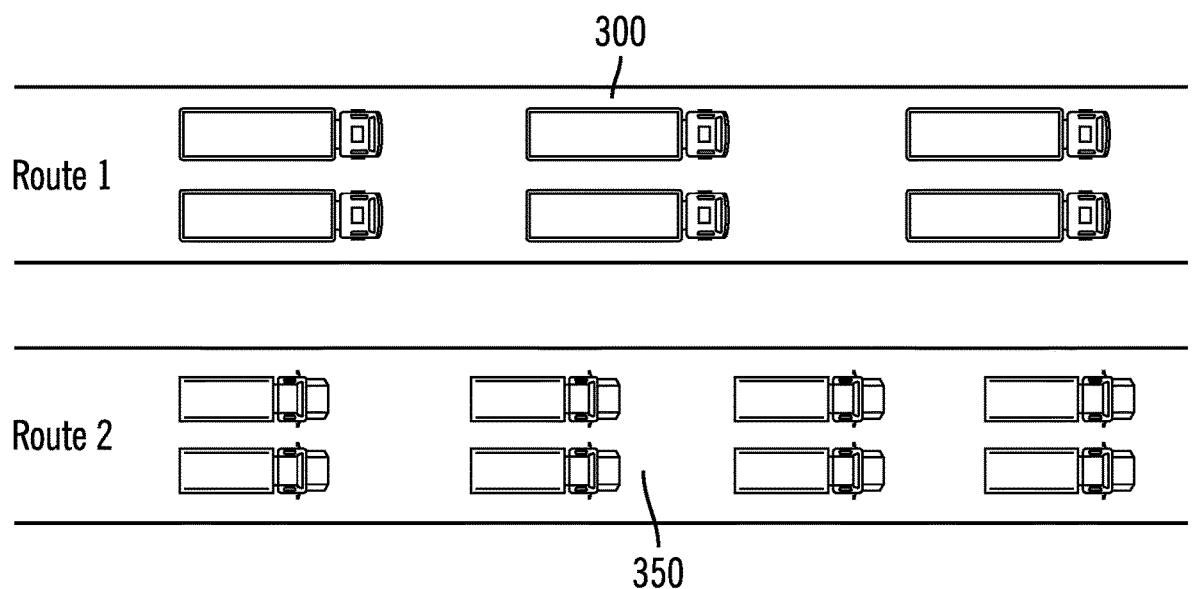
FIG. 3 illustrates example routes in accordance with certain embodiments.

FIG. 3 illustrates example routes 300, 350 in accordance with certain embodiments. In FIG. 3, the road surface radiates heat, which heats the air adjacent to the road surface, and this heated air is effective for pre-heating of inlet air, while reducing the air conditioning efficiency. Based on these factors, the route selector 110a . . . 110n, 160 recommends one of the two routes 300, 350. For example, route 1 is selected for vehicles that need air conditioning (e.g., because they carry goods, such as milk). In this example, the road surface of route 1 is not radiating heat and so not increasing the air temperature adjacent to the road surface. As another example, route 3 is selected for vehicles that do not need air conditioning (e.g., because they carry goods, such as rocks). In this example, the road surface of route 2 is radiating heat and increasing the air temperature adjacent to the road surface, which increases the temperature of the inlet air, and this increases thermal efficiency.

Figure 4A:
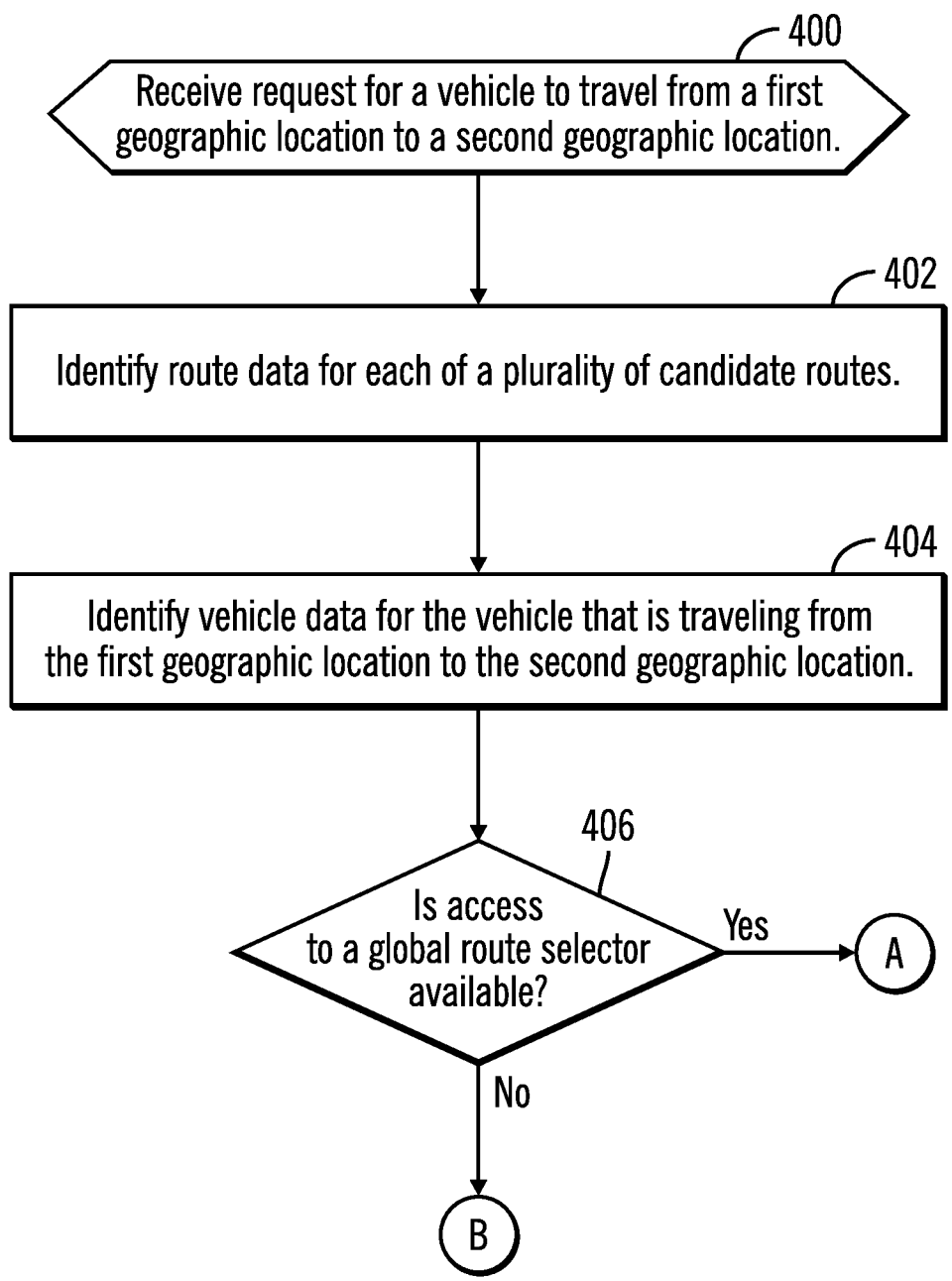
FIGS. 4A, 4B, and 4C illustrate, in a flowchart, operations performed by a route selector of a vehicle in accordance with certain embodiments.
Figure 4B:
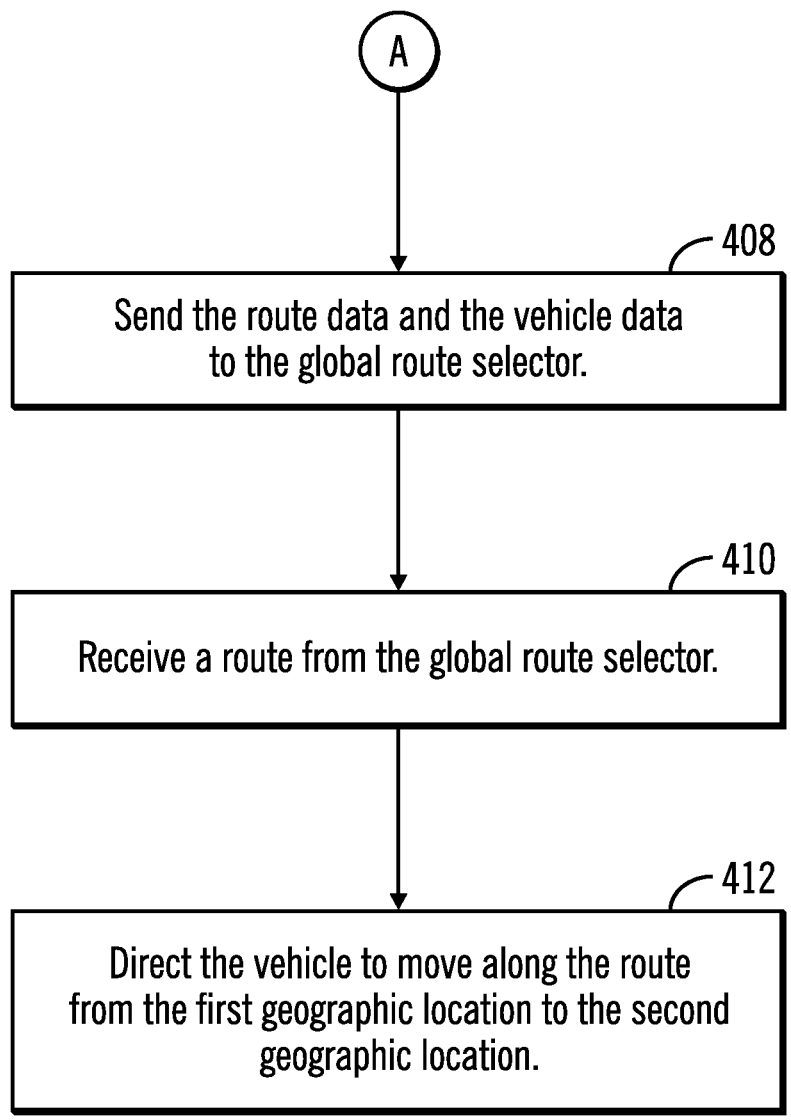
Figure 4C:
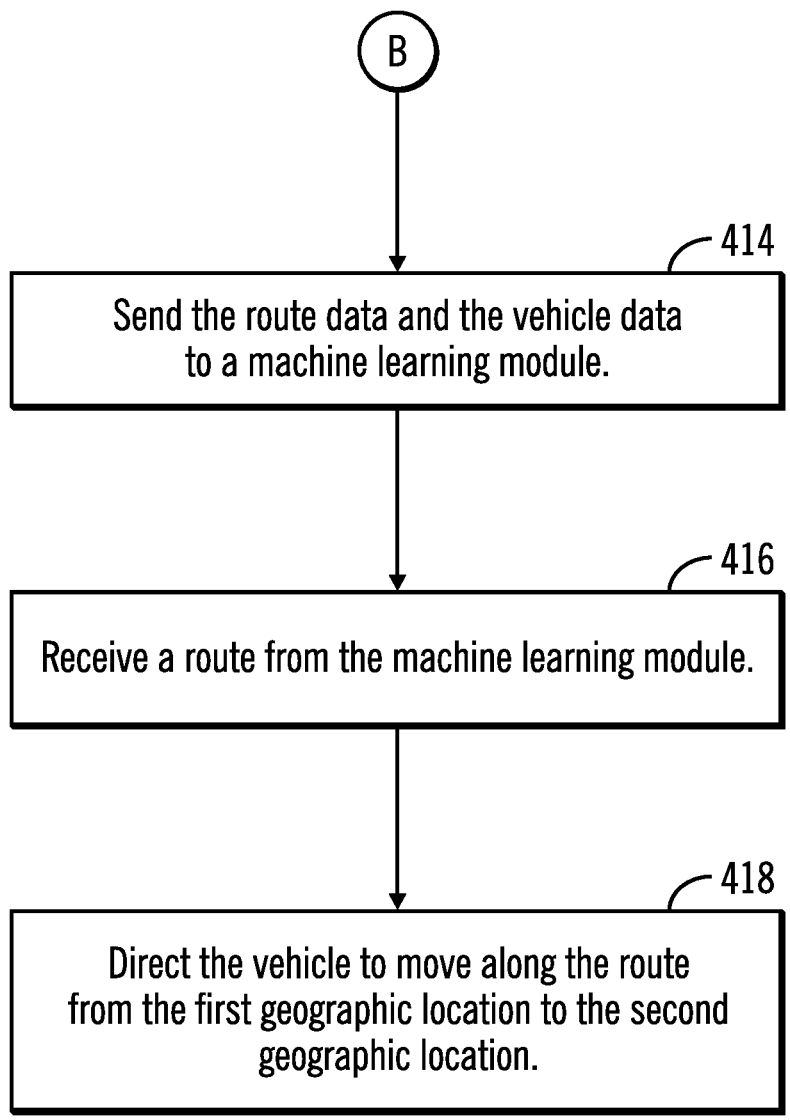

FIGS. 4A, 4B, and 4C illustrate, in a flowchart, operations performed by a route selector of a vehicle in accordance with certain embodiments. In certain embodiments, each route selector 110a . . . 110n performs the operations of FIGS. 4A, 4B, and 4C.

Control begins at block 400 with the route selector 110a . . . 110n receiving a request for a vehicle to travel from a first geographic location to a second geographic location.

In block 402, the route selector 110a . . . 110n identifies route data for each of a plurality of candidate routes. The route data may include, for each portion of a route (i.e., geographic location) at a given time/day, air temperature adjacent to the road surface, road data, and weather data. In block 404, the route selector 110a . . . 110n identifies vehicle data for the vehicle that is traveling from the first geographic location to the second geographic location. The vehicle data may include air conditioning data, the desired temperature of the item being carried, the desired temperature of the inlet air, and the temperature in the vehicle.

In certain embodiments, historically, while a vehicle is travelling along any road, the route selector 110a . . . 110n tracks the air temperature adjacent to the road surface using a sensor installed external to the vehicle and/or using a thermal camera and adds this to the knowledge corpus 141a . . . 141n, 191. In certain embodiments, historically, while the vehicle is travelling along any road, the route selector 110a . . . 110n tracks the temperature of the inlet air using another sensor or a thermal camera and adds this to the knowledge corpus 141a . . . 141n, 191. The temperature of the inlet air is used in determining thermal efficiency, along with the other temperatures and the sensor data. In certain embodiments, historically, while the vehicle is travelling along any road, the route selector 110a . . . 110n tracks the temperature within the vehicle using yet another sensor and adds this to the knowledge corpus 141a . . . 141n, 191. In this manner, the historic temperatures are stored in the knowledge corpus 141a . . . 141n, 191.

In certain embodiments, the air temperature adjacent to the road surface is stored in the knowledge corpus 141a . . . 141n for different contextual situations (e.g., geographic locations, material used for constructing the road, time of day, weather conditions, etc.).

In certain embodiments, the geographical location is identified using a Global Positioning Sensor (GPS). In certain embodiments, the time is identified using a clock in the vehicle. In certain embodiments, the weather conditions are identified using weather data from one or more sensors, from a web site, etc. In certain embodiments, the route selector 110a . . . 110n identifies the route and performs end to end simulation (while taking into account the air temperature adjacent to the road surface at different times) to identify a road for thermal efficiency (e.g., a road providing more efficiency of energy than other roads).

The air conditioning data indicates whether air conditioning is needed inside the vehicle and what the temperature or temperature range should be. In addition, the air conditioning data indicates how much energy is required for air conditioning and how many air conditioning units are running in the vehicle. With embodiments, the route selector 110a . . . 110n calculates the energy required for air conditioning of the vehicle based on the temperature of the inlet air and the air temperature adjacent to the road surface.

In block 406, the route selector 110a . . . 110n determines whether access to a global route selector 160 is available. If so, processing continues to block 408 (FIG. 4B), otherwise, processing continues to block 414 (FIG. 4C). In certain embodiments, the route selector 110a . . . 110n is unable to access the global route selector 160 because the cloud node 150 is down, because the network transferring data between the computing system 100a . . . 100n and the cloud node 150 is down, etc. When there is access to the global route selector 160, the global route selector 160 uses data from multiple vehicles to identify the route that is best for the desired inlet air temperature. When there is no access to the global route selector 160, the route selector 110a . . . 110n of the vehicle uses the data for that vehicle to identify the route that is best for the desired inlet air temperature.

In block 408, the route selector 110a . . . 110n sends the route data and the vehicle data to the global route selector.

In block 410, the route selector 110a . . . 110n receives a route from the global route selector 160. The route starts at the first geographic location and ends at the second geographic location. In certain embodiments, the route specifies a lane out of multiple lanes of the route and/or specifies a time at which to travel. In certain embodiments, one or more routes are received, along with an associated ranking of the routes.

In block 412, the route selector 110a . . . 110n directs the vehicle to move along the route from the first geographic location to the second geographic location. In certain embodiments, directing the vehicle may be described as the route selector 110a . . . 110n working with a navigation system of the vehicle to automatically move the vehicle along the route (e.g., in an auto-driving vehicle). In other embodiments, directing the vehicle may be described as the route selector 110a . . . 110n displaying the route for a human driver to follow.

In block 414, the route selector 110a . . . 110n sends the route data and the vehicle data to a machine learning module 120a . . . 120n.

In block 416, the route selector 110a . . . 110n receives a route from the machine learning module 120a . . . 120n. The route starts at the first geographic location and ends at the second geographic location. In certain embodiments, the route specifies a lane out of multiple lanes of the route and/or specifies a time at which to travel. In certain embodiments, one or more routes are received, along with an associated ranking of the routes.

In block 418, the route selector 110a . . . 110n directs the vehicle to move along the route from the first geographic location to the second geographic location. In certain embodiments, directing the vehicle may be described as the route selector 110a . . . 110n working with a navigation system of the vehicle to automatically move the vehicle along the route (e.g., in an auto-driving vehicle). In other embodiments, directing the vehicle may be described as the route selector 110a . . . 110n displaying the route for a human driver to follow.

In certain embodiments, the route selector 110a . . . 110n identifies the energy required by the vehicle. In certain embodiments, the route selector 110a . . . 110n uses the knowledge corpus to predict the thermal efficiency of the vehicle taking into account that various types of vehicles travel a different amount of distance, in a different time frame, and take into account the air temperature adjacent to the road surface.

With embodiment, when any journey is planned, the route selector 110a . . . 110n receives the data for the vehicle regarding distribution of air conditioning in different parts of the journey. The route selector 110a . . . 110n recommends an appropriate route to the vehicle so that the vehicle may travel the route that has a higher degree of thermal efficiency than other possible routes.

In certain embodiments, the route selector 110a . . . 110n identifies any change in need of air conditioning and the benefit of pre-heated inlet air and recommends an appropriate route.

In certain embodiments, the route selector 110a . . . 110n uses the knowledge corpus to recommend how the road is to be constructed. The recommendation of the construction of the road may indicate the types of material to be used to generate a desired air temperature adjacent to the road surface.

In certain embodiments, the route selector 110a . . . 110n identifies total traffic load and recommends how the traffic is to be distributed so that, aggregated thermal efficiency is maximized.

Figure 5:
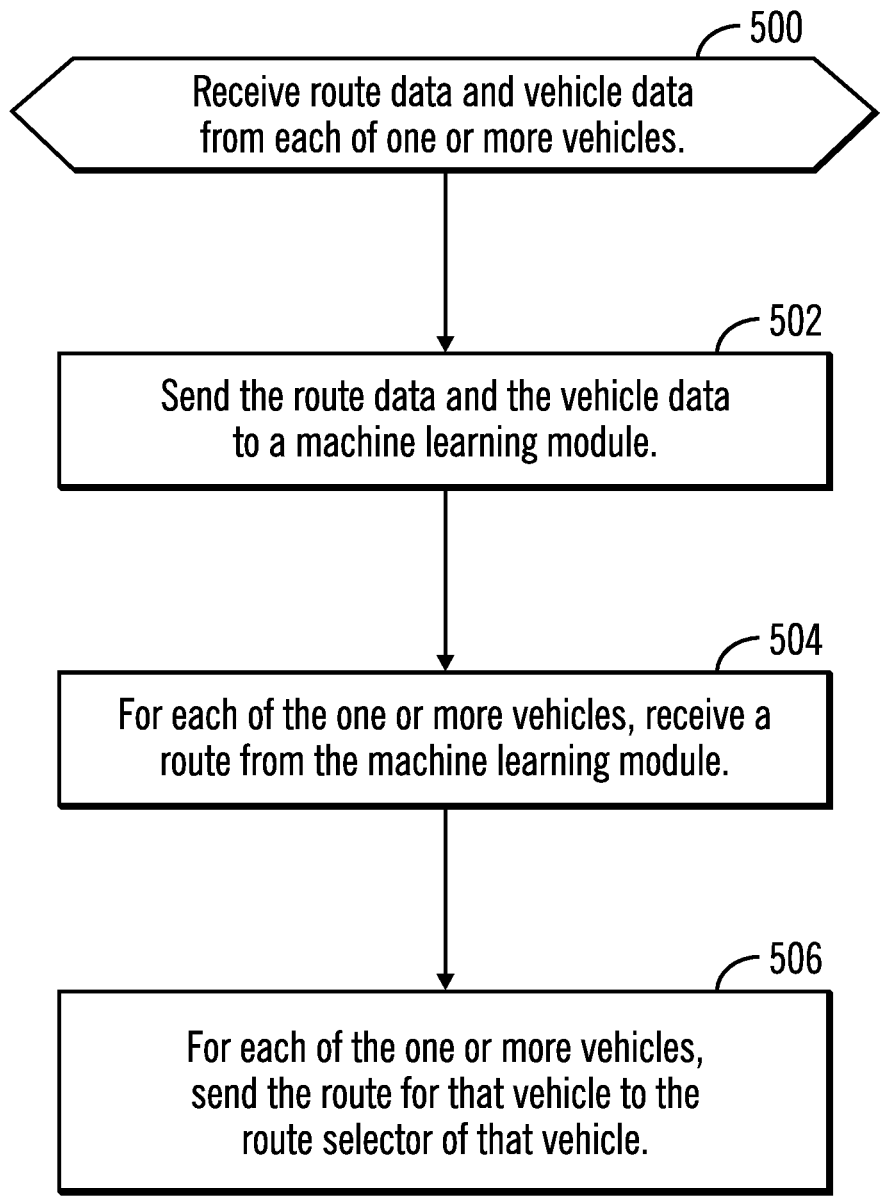
FIG. 5 illustrates, in a flowchart, operations performed by a global route selector in accordance with certain embodiments.

FIG. 5 illustrates, in a flowchart, operations performed by a global route selector 160 in accordance with certain embodiments. Control begins at block 500 with the global route selector 160 receiving route data (that includes temperature data, road data, and weather data) and vehicle data from each of one or more vehicles.

In block 502, the global route selector 160 sends the route data and the vehicle data to a machine learning module 170.

In block 504, for each of the one or more vehicles, the global route selector receives a route from the machine learning module. The route starts at the first geographic location and ends at the second geographic location. In certain embodiments, the route specifies a lane out of multiple lanes of the route and/or specifies a time at which to travel. In certain embodiments, one or more routes are received, along with an associated ranking of the routes.

In block 506, for each of the one or more vehicles, the global route selector 160 sends the route for that vehicle to the route selector of that vehicle 110a . . . 110n.

With embodiments, the air temperature adjacent to the road surface is one parameter for the IC engine. Hot inlet air may improve thermal efficiency with pre-heating, and at the same time, hot air temperature adjacent to the road surface may result in using more energy for air conditioning. Different types of road surfaces generate different amounts of surface air temperature. In addition, geographic parameters may be useful considerations (e.g., the road has many trees that produce shade and cool the air, etc.). In certain embodiments, the route selector 110a . . . 110n, 160 identifies fuel-efficient routes based on these parameters.

With embodiments, using historical learning, the route selector 110a . . . 110n, 160 predicts air temperature adjacent to the road surface. This may be based on the type of material used in road construction and climatic conditions. Also, based on desired air conditioning and pre-heating of inlet air temperature, the route selector 110a . . . 110n, 160 identifies an appropriate route for each vehicle of different vehicles. Any one or more subsets of the different vehicles may be provided the same route. Any one or more subsets of the different vehicles may be provided different routes.

Figure 6:
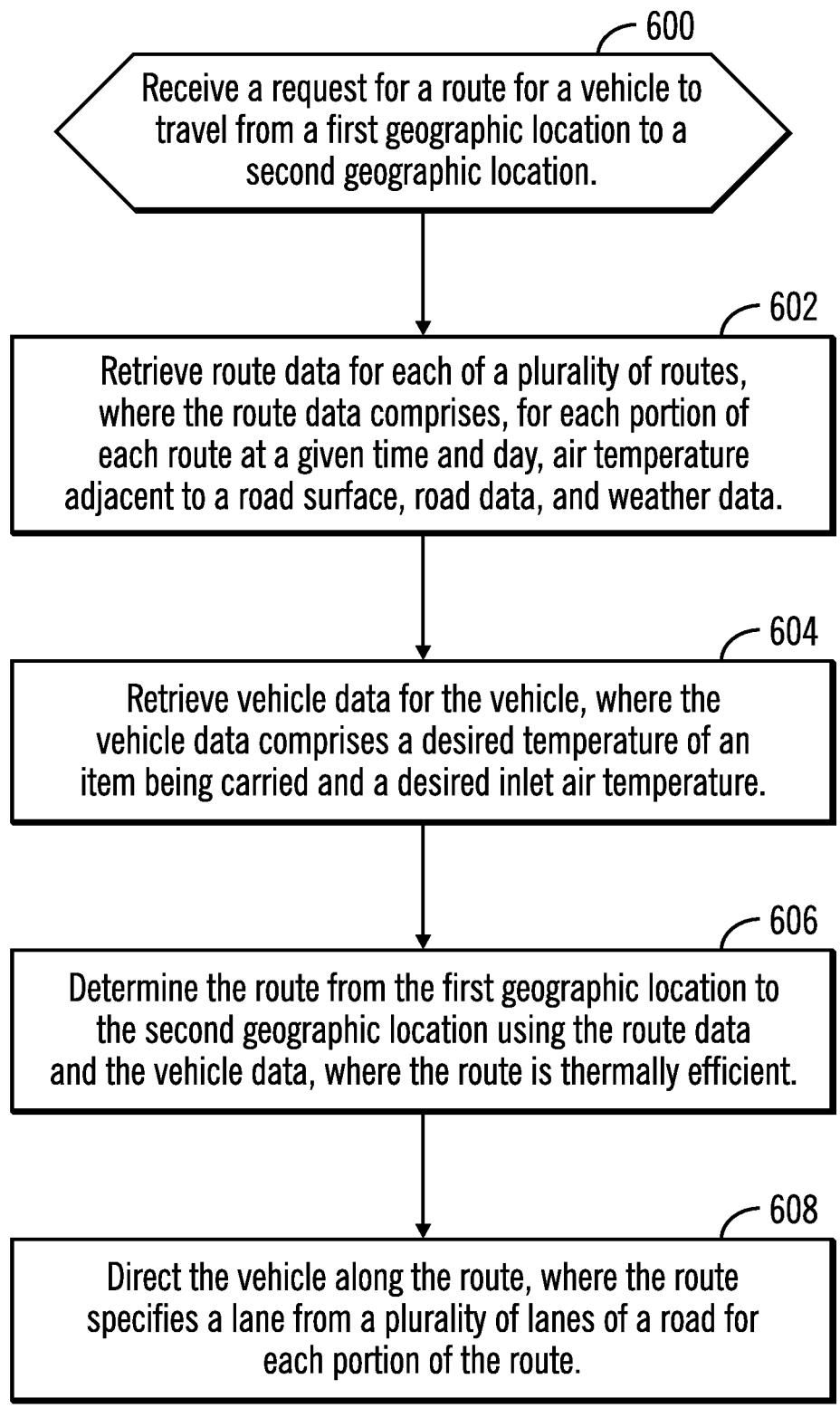
FIG. 6 illustrates, in a flowchart, operations for determining a thermally efficient route in accordance with certain embodiments.

FIG. 6 illustrates, in a flowchart, operations for determining a thermally efficient route in accordance with certain embodiments. In certain embodiments, any route selector 110a . . . 110n, 160 may identify a thermally efficient route.

Control begins at block 600 with the route selector 110a . . . 110n, 160 receives a request for a route for a vehicle to travel from a first geographic location to a second geographic location. In block 602, the route selector 110a . . . 110n, 160 retrieves route data for each of a plurality of routes, where the route data comprises, for each portion of each route at a given time and day, air temperature adjacent to a road surface, road data, and weather data. In certain embodiments, the route selector 110a . . . 110n, 160 uses historic data of air temperatures adjacent to a portion of a road surface to predict the air temperature adjacent to the road surface for that portion of a route that may be taken. That is, the route selector 110a . . . 110n, 160 may use the route data to predict the air temperature adjacent to the road surface for each portion of each of a plurality of routes. In certain embodiments, multiple air temperatures adjacent to the road surface may be retrieved and used to predict the air temperatures adjacent to the surface of different portions of a route.

In block 604, the route selector 110a . . . 110n, 160 retrieves vehicle data for the vehicle, where the vehicle data comprises a desired temperature of an item being carried and a desired inlet air temperature.

In block 606, the route selector 110a . . . 110n, 160 determines the route from the first geographic location to the second geographic location using the route data and the vehicle data, where the route is thermally efficient. This determining may be performed using a machine learning module. In certain embodiments, route selector 110a . . . 110n, 160 predicts the air temperature adjacent to the surface of a road for a particular time of day based on historical air temperatures adjacent to the surface of that road. Then, the predicted air temperature adjacent to the surface of the road (e.g., for a portion of the road) is used with the heat transfer formula with the desired temperature of an item being carried for a first heat transfer value, and the predicted air temperature adjacent to the surface of the road is used with the heat transfer formula with the desired inlet air temperature for a second heat transfer value. The route selector 110a . . . 110n, 160 uses the first heat transfer value and the second heat transfer value to generate a final heat transfer value for the road. In this manner, the route selector 110a . . . 110n, 160 determines the final heat transfer value for each of a plurality of routes and selects the route that is thermally efficient. If multiple routes have the same or similar final heat transfer values, the route selector 110a . . . 110n, 160 uses other factors (e.g., traffic load) to select a route from the multiple routes.

In block 608, the route selector 110a . . . 110n, 160 directs the vehicle along the route, where the route specifies a lane from a plurality of lanes of a road for each portion of the route. For example, for a three lane road (Lane1, Lane2, Lane3), the route may indicate that the vehicle travel in Lane2 for a first portion of the route, travel in Lane3 for a second portion of the route, and travel in Lane1 for a third portion of the route. Also, the recommended lane may change as the number of lanes changes (e.g., a three lane road becomes a two lane road or the route recommends traveling form a three lane road to a different, four lane road).

Figure 7:
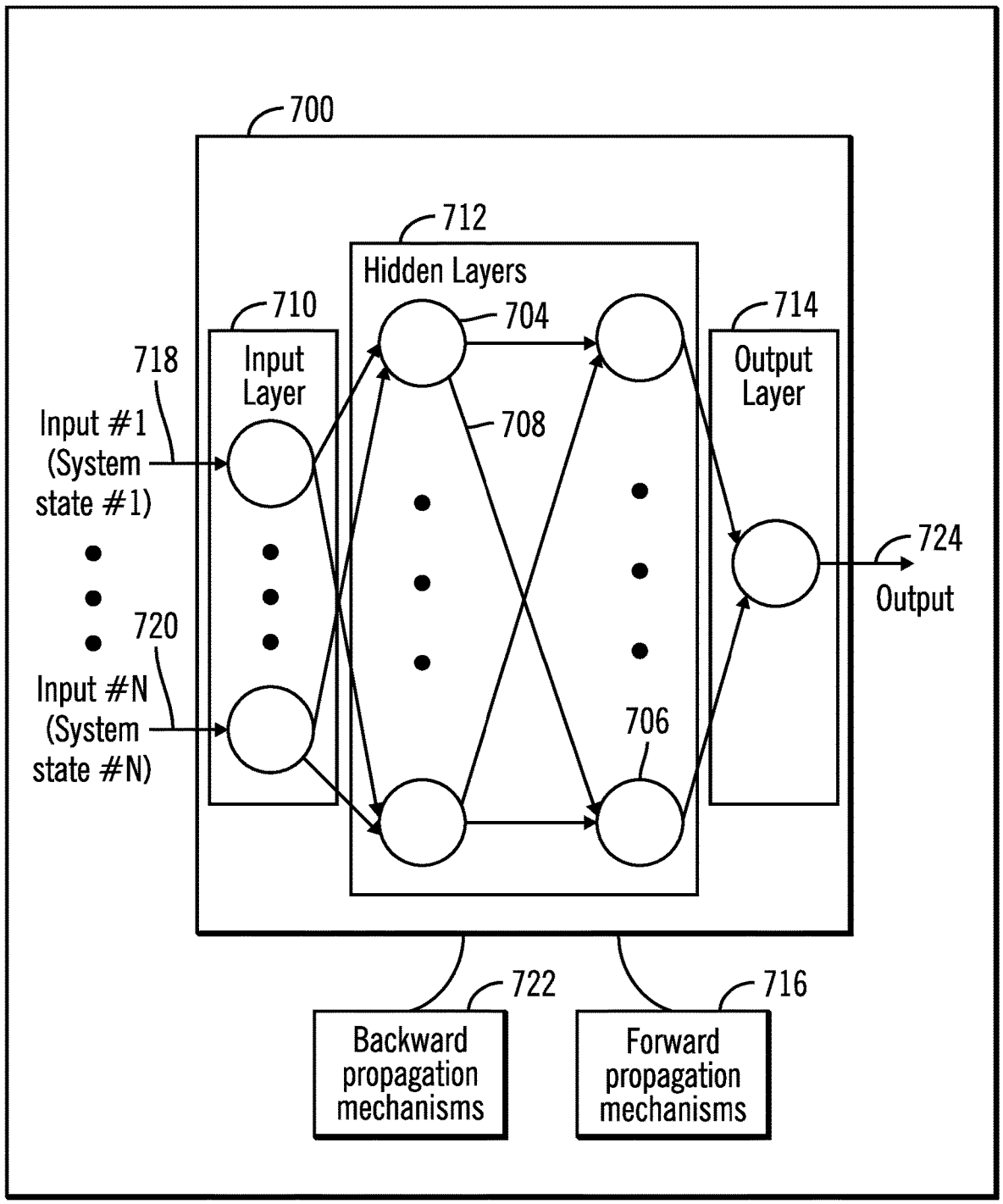
FIG. 7 illustrates, in a block diagram, details of a machine learning module in accordance with certain embodiments.

FIG. 7 illustrates, in a block diagram, details of a machine learning module 700 in accordance with certain embodiments. In certain embodiments, each of the one or more machine learning modules 120a . . . 120n, 170 may be implemented using the components of the machine learning module 700.

The machine learning module 700 may comprise a neural network with a collection of nodes with links connecting them, where the links are referred to as connections. For example, FIG. 7 shows a node 704 connected by a connection 708 to the node 706. The collection of nodes may be organized into three main parts: an input layer 710, one or more hidden layers 712, and an output layer 714.

The connection between one node and another is represented by a number called a weight, where the weight may be either positive (if one node excites another) or negative (if one node suppresses or inhibits another). Training the machine learning module 700 entails calibrating the weights in the machine learning module 700 via mechanisms referred to as forward propagation 716 and backward propagation 722. Bias nodes that are not connected to any previous layer may also be maintained in the machine learning module 700. A bias may be described as an extra input of 1 with a weight attached to it for a node.

In forward propagation 716, a set of weights are applied to the input data 718 . . . 720 to calculate the output 724. For the first forward propagation, the set of weights may be selected randomly or set by, for example, a system administrator. That is, in the forward propagation 716, embodiments apply a set of weights to the input data 718 . . . 720 and calculate an output 724.

In backward propagation 722 a measurement is made for a margin of error of the output 724, and the weights are adjusted to decrease the error. Backward propagation 722 compares the output that the machine learning module 700 produces with the output that the machine learning module 700 was meant to produce, and uses the difference between them to modify the weights of the connections between the nodes of the machine learning module 700, starting from the output layer 714 through the hidden layers 712 to the input layer 710, i.e., going backward in the machine learning module 700. In time, backward propagation 722 causes the machine learning module 700 to learn, reducing the difference between actual and intended output to the point where the two come very close or coincide.

The machine learning module 700 may be trained using backward propagation to adjust weights at nodes in a hidden layer to produce adjusted output values based on the provided inputs 718 . . . 720. A margin of error may be determined with respect to the actual output 724 from the machine learning module 700 and an expected output to train the machine learning module 700 to produce the desired output value based on a calculated expected output. In backward propagation, the margin of error of the output may be measured and the weights at nodes in the hidden layers 712 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 700 is configured to repeat both forward and backward propagation until the weights of the machine learning module 700 are calibrated to accurately predict an output.

The machine learning module 700 implements a machine learning technique such as decision tree learning, association rule learning, artificial neural network, inductive programming logic, support vector machines, Bayesian models, etc., to determine the output value 724.

In certain machine learning module 700 implementations, weights in a hidden layer of nodes may be assigned to these inputs to indicate their predictive quality in relation to other of the inputs based on training to reach the output value 724.

With embodiments, the machine learning module 700 is a neural network, which may be described as a collection of "neurons" with "synapses" connecting them.

With embodiments, there may be multiple hidden layers 712, with the term "deep" learning implying multiple hidden layers. Hidden layers 712 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 716 and the backward propagation 722.

In backward propagation 722, embodiments measure the margin of error of the output and adjust the weights accordingly to decrease the error.

Neural networks repeat both forward and backward propagation until the weights are calibrated to accurately predict the output 724.

In certain embodiments, the machine learning module 700 may be refined based on whether the outputs are indicated as accurate.

Figure 8:
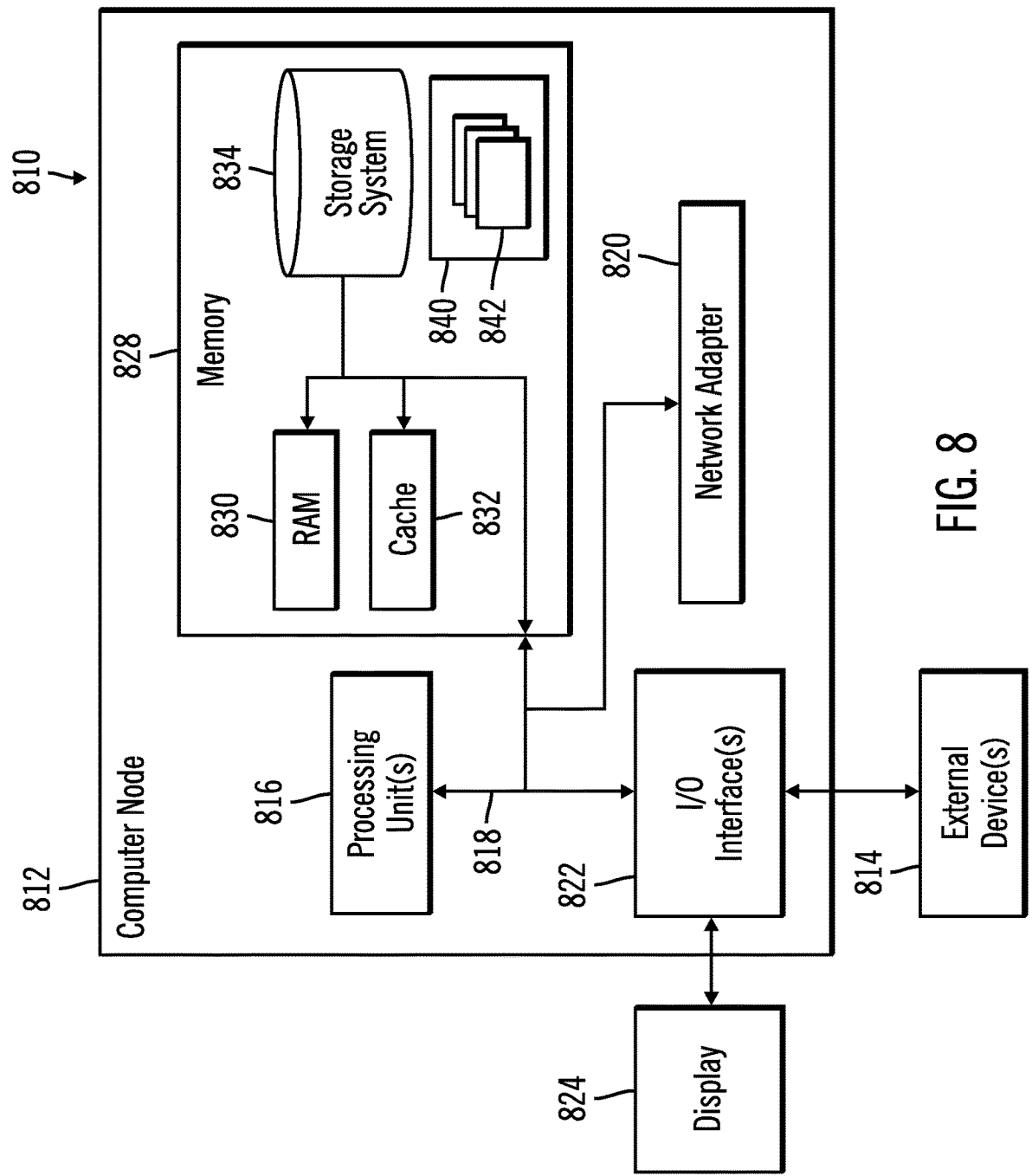
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, Redundant Array of Inexpensive Disks (RAID) systems, tape drives, and data archival storage systems, etc.

In certain embodiments, each computing system 100*a* . . . 100*n* and the cloud node 150 has the architecture of computer node 812.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
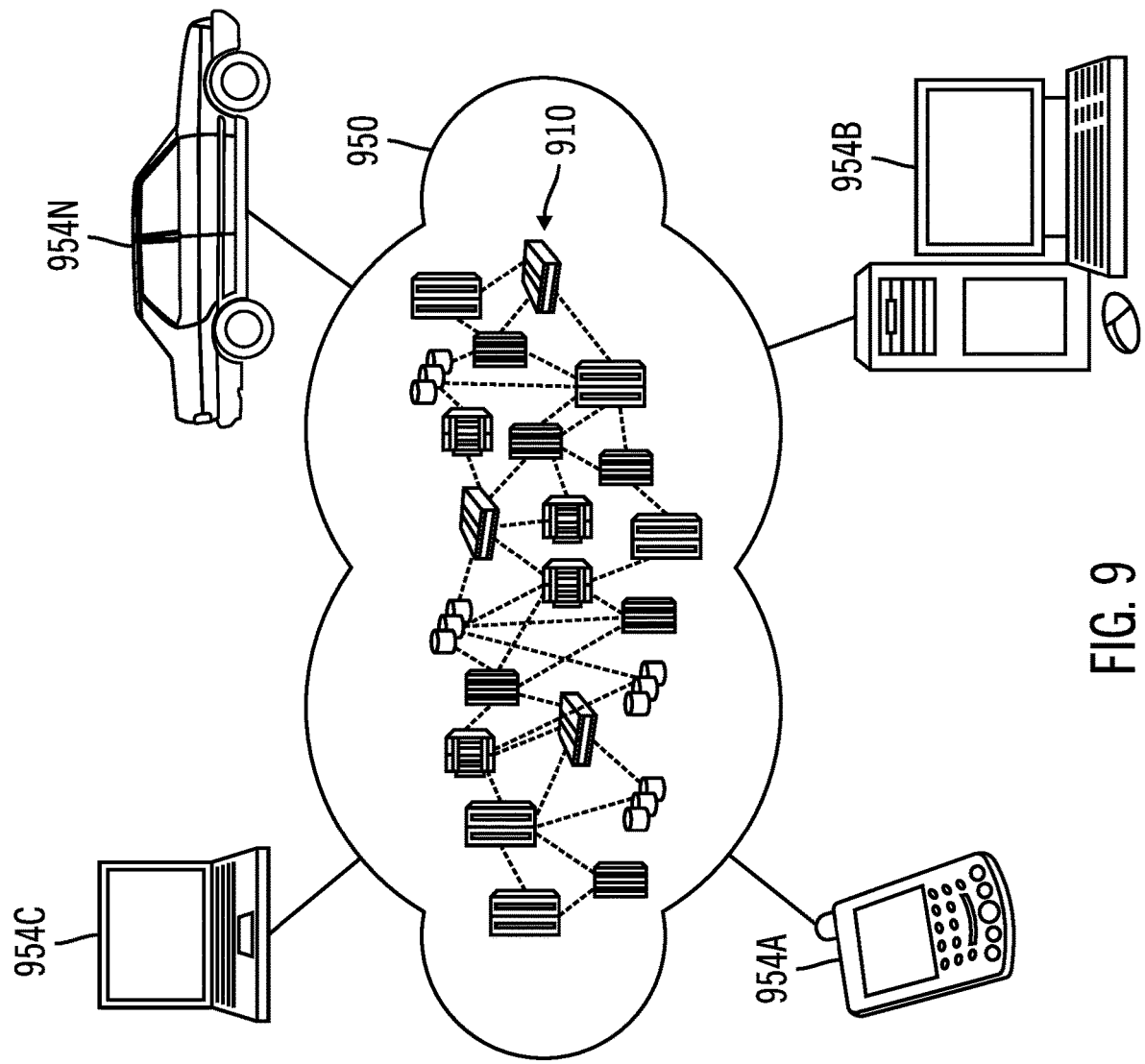
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
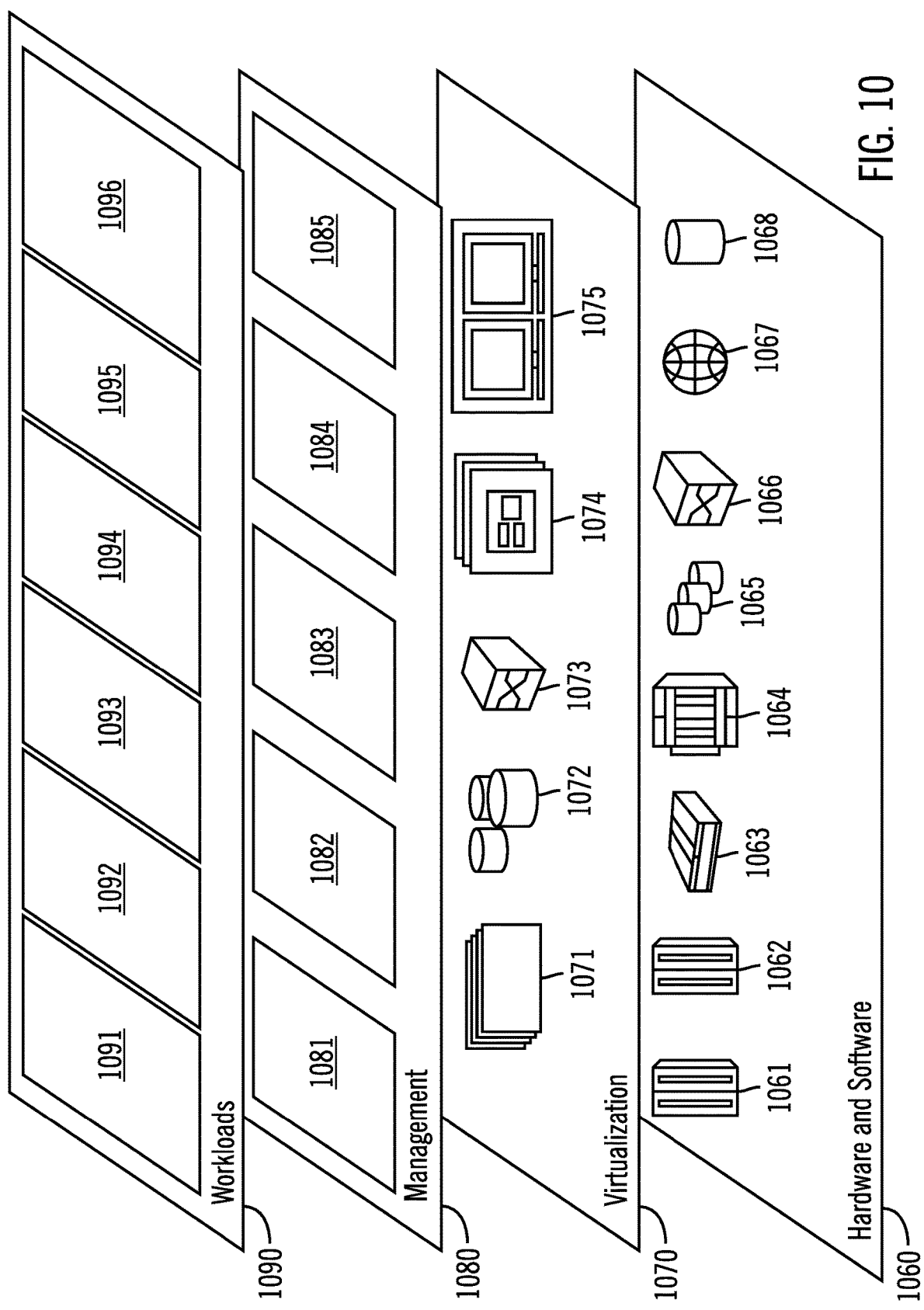
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and thermally efficient route selection 1096.

Thus, in certain embodiments, software or a program, implementing thermally efficient route selection in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
receiving a request for a route for a vehicle to travel from a first geographic location to a second geographic location;
retrieving route data for each of a plurality of routes, wherein the route data comprises, for each portion of each route at a given time and day, air temperature adjacent to a road surface;

retrieving vehicle data for the vehicle, wherein the vehicle data comprises a desired temperature of an item being carried and a desired inlet air temperature of pre-heated inlet air;

determining the route from the first geographic location to the second geographic location using the route data and the vehicle data, wherein the route is thermally efficient, by:

for each route of the plurality of routes, determining a final heat transfer value by combining a first heat transfer value for the desired temperature of the item being carried and a second heat transfer value for the desired inlet air temperature of the pre-heated inlet air based on:

determining the first heat transfer value based on the air temperature adjacent to the road surface and the desired temperature of the item being carried; and determining the second heat transfer value based on the air temperature adjacent to the road surface and the desired inlet air temperature of the pre-heated inlet air; and selecting the route from the plurality of routes based on each final heat transfer value; and automatically directing the vehicle along the route, wherein the route specifies a lane from a plurality of lanes of a road for each portion of the route.

2. The computer-implemented method of claim 1, comprising operations for:

sending the route data and the vehicle data to a machine learning module; and receiving the route from the machine learning module.

3. The computer-implemented method of claim 1, wherein, a global route selector at a cloud node:

receives, from each of a plurality of vehicles, the route data and the vehicle data;

sends the route data and the vehicle data from each of the plurality of vehicles to a machine learning module; and receives, for each of the plurality of vehicles, a route from the machine learning module.

4. The computer-implemented method of claim 1, comprising operations for:

determining that access to a cloud node is available; and sending the route data and the vehicle data to the cloud node, wherein the route is received from the cloud node.

5. The computer-implemented method of claim 1, wherein the route data comprises historic data and current data, and wherein the route data further comprises road data and weather data.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:

receiving a request for a route for a vehicle to travel from a first geographic location to a second geographic location;

retrieving route data for each of a plurality of routes, wherein the route data comprises, for each portion of each route at a given time and day, air temperature adjacent to a road surface;

retrieving vehicle data for the vehicle, wherein the vehicle data comprises a desired temperature of an item being carried and a desired inlet air temperature of pre-heated inlet air;

determining the route from the first geographic location to the second geographic location using the route data and the vehicle data, wherein the route is thermally efficient, by:

for each route of the plurality of routes, determining a final heat transfer value by combining a first heat transfer value for the desired temperature of the item being carried and a second heat transfer value for the desired inlet air temperature of the pre-heated inlet air based on:

determining the first heat transfer value based on the air temperature adjacent to the road surface and the desired temperature of the item being carried; and determining the second heat transfer value based on the air temperature adjacent to the road surface and the desired inlet air temperature of the pre-heated inlet air; and selecting the route from the plurality of routes based on each final heat transfer value; and automatically directing the vehicle along the route, wherein the route specifies a lane from a plurality of lanes of a road for each portion of the route.

8. The computer program product of claim 7, wherein the program code executable by the at least one processor to perform operations for:

sending the route data and the vehicle data to a machine learning module; and receiving the route from the machine learning module.

9. The computer program product of claim 7, wherein, a global route selector at a cloud node:

receives, from each of a plurality of vehicles, the route data and the vehicle data;

sends the route data and the vehicle data from each of the plurality of vehicles to a machine learning module; and receives, for each of the plurality of vehicles, a route from the machine learning module.

10. The computer program product of claim 7, wherein the program code executable by the at least one processor to perform operations for:

determining that access to a cloud node is available; and sending the route data and the vehicle data to the cloud node, wherein the route is received from the cloud node.

11. The computer program product of claim 7, wherein the route data comprises historic data and current data, and wherein the route data further comprises road data and weather data.

12. The computer program product of claim 7, wherein a Software as a Service (SaaS) is configured to perform the operations of the computer program product.

13. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising: receiving a request for a route for a vehicle to travel from a first geographic location to a second geographic location;

retrieving route data for each of a plurality of routes, wherein the route data comprises, for each portion of each route at a given time and day, air temperature adjacent to a road surface;

retrieving vehicle data for the vehicle, wherein the vehicle data comprises a desired temperature of an item being carried and a desired inlet air temperature of pre-heated inlet air;

determining the route from the first geographic location to the second geographic location using the route data and the vehicle data, wherein the route is thermally efficient, by:

for each route of the plurality of routes, determining a final heat transfer value by combining a first heat transfer value for the desired temperature of the item being carried and a second heat transfer value for the desired inlet air temperature of the pre-heated inlet air based on:

determining the first heat transfer value based on the air temperature adjacent to the road surface and the desired temperature of the item being carried; and determining the second heat transfer value based on the air temperature adjacent to the road surface and the desired inlet air temperature of the pre-heated inlet air; and selecting the route from the plurality of routes based on each final heat transfer value; and automatically directing the vehicle along the route, wherein the route specifies a lane from a plurality of lanes of a road for each portion of the route.

14. The computer system of claim 13, further comprising operations for: sending the route data and the vehicle data to a machine learning module; and
receiving the route from the machine learning module.

15. The computer system of claim 13, wherein, a global route selector at a cloud node:
receives, from each of a plurality of vehicles, the route data and the vehicle data;
sends the route data and the vehicle data from each of the plurality of vehicles to a machine learning module; and
receives, for each of the plurality of vehicles, a route from the machine learning module.

16. The computer system of claim 13, further comprising operations for: determining that access to a cloud node is available; and
sending the route data and the vehicle data to the cloud node, wherein the route is received from the cloud node.

17. The computer system of claim 13, wherein the route data comprises historic data and current data, and wherein the route data further comprises road data and weather data.

18. The computer system of claim 13, wherein a Software as a Service (SaaS) is configured to perform the operations of the computer system.

19. The computer-implemented method of claim 1, wherein determining the first heat transfer value and the second heat transfer value uses a heat transfer formula.

20. The computer program product of claim 7, wherein determining the first heat transfer value and the second heat transfer value uses a heat transfer formula.

* * * * *